US012572883B2

(12) United States Patent
Dearing

(10) Patent No.: US 12,572,883 B2
(45) Date of Patent: Mar. 10, 2026

(54) DYNAMICALLY CONFIGURABLE ITEM ADDRESSING SYSTEM

(71) Applicant: United States Postal Service, Washington, DC (US)

(72) Inventor: Stephen M. Dearing, Herndon, VA (US)

(73) Assignee: United States Postal Service, Washington, DC (US)

( * ) Notice: Subject to any disclaimer, the term of this patent is extended or adjusted under 35 U.S.C. 154(b) by 737 days.

(21) Appl. No.: 16/670,665

(22) Filed: Oct. 31, 2019

(65) Prior Publication Data

US 2020/0143322 A1      May 7, 2020

Related U.S. Application Data

(60) Provisional application No. 62/754,093, filed on Nov. 1, 2018.

(51) Int. Cl.
| | |
|---|---|
| *G06Q 10/0833* | (2023.01) |
| *G06K 7/10* | (2006.01) |
| *G06K 19/077* | (2006.01) |

(52) U.S. Cl.
CPC ..... *G06Q 10/0833* (2013.01); *G06K 7/10861* (2013.01); *G06K 19/0776* (2013.01)

(58) Field of Classification Search
CPC ........... G06Q 10/0833; G06K 19/0776; G06K 7/10861
See application file for complete search history.

(56) References Cited

U.S. PATENT DOCUMENTS

| | | | | |
|---|---|---|---|---|
| 2005/0234785 A1* | 10/2005 | Burman | ................. | G06K 17/00 705/28 |
| 2006/0235739 A1* | 10/2006 | Levis | .................... | G06Q 10/08 705/1.1 |
| 2009/0281929 A1* | 11/2009 | Boitet | ................... | G06Q 10/08 705/28 |

(Continued)

OTHER PUBLICATIONS

E Ink News. (n.d.). https://www.eink.com/news/detail/E-Ink-and-LivingPackets-Announce-Sustainable-Reusable-Packaging-for-eCommerce-and-Logistics#:~:text=All%20data%20can%20be%20accessed,or%20www.eink.com. (Jan. 6, 2020). (Year: 2020).*

*Primary Examiner* — Shannon S Campbell
*Assistant Examiner* — Manal A. Alsamiri
(74) *Attorney, Agent, or Firm* — Knobbe, Martens, Olson & Bear LLP

(57) ABSTRACT

Systems and methods for real-time or near real-time updates to a label affixed to an item being transported within a distribution network. Systems may include a dynamically configurable label including an electronic display configured to display any desired sequence of alphanumeric characters and/or symbols. Dynamically configurable labels may further include one or more remote communication interfaces, such that a command to update the displayed label information may be sent to the dynamically configurable label from a remote location, such as a server or other administrative computing device. Updates to the dynamically configurable labels may be implemented based on a predetermined sequence of conditional label information and/or may be determined and implemented in real-time or near real-time based on item information updates, detected conditions, delivery errors, or the like.

20 Claims, 8 Drawing Sheets

(56)  References Cited

U.S. PATENT DOCUMENTS

| | | | |
|---|---|---|---|
| 2009/0314835 A1* | 12/2009 | Jackson | G07B 17/00508 |
| | | | 235/384 |
| 2014/0352334 A1* | 12/2014 | Barakat | G01K 7/42 |
| | | | 62/62 |
| 2015/0324733 A1* | 11/2015 | Goodall | G06Q 10/08 |
| | | | 705/330 |
| 2017/0004445 A1* | 1/2017 | Lazier | G06Q 10/08 |
| 2018/0268370 A1* | 9/2018 | Fallah | H04L 63/0428 |
| 2018/0315015 A1* | 11/2018 | Pientka | G06Q 10/063 |

* cited by examiner

100

400

RECEIVE AND STORE ITEM
INFORMATION UPDATE
— 402

LABEL INFORMATION
UPDATE REQUIRED?
— 404

—NO—

NO LABEL INFORMATION
UPDATE

406

YES

DETERMINE LABEL INFORMATION
UPDATE BASED ON ITEM
INFORMATION UPDATE
— 408

TRANSMIT LABEL INFORMATION
UPDATE TO LABEL
— 410

CAUSE LABEL TO DISPLAY
UPDATED LABEL INFORMATION
— 412

500

RECEIVE AND STORE ITEM
INFORMATION UPDATE    502

TRANSMIT ITEM INFORMATION
UPDATE TO SERVER    504

RECEIVE UPDATED LABEL
INFORMATION    506

DISPLAY UPDATED LABEL
INFORMATION    508

600

RECEIVE AND STORE
CONDITIONAL LABEL
INFORMATION — 602

DISPLAY INITIAL LABEL
INFORMATION — 604

ENTER DISTRIBUTION NETWORK — 606

RECEIVE INPUT CORRESPONDING
TO LABEL INFORMATION UPDATE — 608

DISPLAY UPDATED LABEL
INFORMATION — 610

ARRIVE AT DESTINATION POINT — 612

DYNAMICALLY CONFIGURABLE ITEM ADDRESSING SYSTEM

CROSS-REFERENCE TO RELATED APPLICATIONS

This application claims the benefit of U.S. Provisional Application Ser. No. 62/754,093, filed Nov. 1, 2018, entitled DYNAMICALLY CONFIGURABLE ITEM ADDRESSING SYSTEM, which is hereby incorporated by reference in its entirety and for all purposes.

FIELD

This disclosure relates to systems and methods for the distribution of items in a distribution network.

DESCRIPTION OF THE RELATED TECHNOLOGY

Items, such as parcels, packages, envelopes, etc., may be shipped, moved, transported, and the like in a distribution network and transferred to recipients at delivery points. Items are typically delivered to locations indicated on a label affixed to the item. Item distribution based on printed labels is relatively inflexible as it may be difficult or impossible to change delivery information before an item is delivered to its original delivery point.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one embodiment, a system for delivery of items is described. The system comprises a dynamically configurable label for delivery of an item, comprising an electronic display configured to display a destination point identifier corresponding to a destination point to which the item is intended to be delivered, and a network communication module configured for wireless communication; and a server in communication with the network communication module via a network. The server is configured to receive item information updates, determine one or more label information updates based on the item information updates, and cause the dynamically configurable label to display updated label information corresponding to the one or more label information updates, based at least in part on the item information updates.

In some embodiments, the electronic display comprises an electronic ink display. In some embodiments, the server is further in communication with a database, the database storing item information associated with the item. In some embodiments, the item information updates comprises one or more of a revised delivery address, a request to return the item to a sender, a request to change a standard of service associated with the item, and a condition notification associated with the destination point identifier. In some embodiments, the dynamically configurable label comprises a GPS receiver. In some embodiments, the GPS receiver is in communication with the network communication module, and the network communication module is configured to send location information from the GPS receiver to the server. In some embodiments, the GPS receiver is in communication with a processor within the dynamically configurable label, and the processor is configured to cause the electronic display to display locally updated label information based at least in part on location information received from the GPS receiver. In some embodiments, the dynamically configurable label comprises a secondary indicator configured to produce at least one of light and sound, the secondary indicator configured to produce a visible or audible notification associated with display of the updated label information.

In another embodiment, a method for distributing items to recipients is described. The method comprises receiving, at a facility in a distribution network, an item having a dynamically configurable label affixed thereto, the dynamically configurable label comprising an electronic display displaying first label information corresponding to the item; receiving, at a server of the distribution network, an update to item information corresponding to the item; generating, at the server, second label information different from the first label information based at least in part on the update to the item information; transmitting, from the server to the dynamically configurable label, a label information update comprising the second label information; and causing the electronic display of the dynamically configurable label to display the second label information.

In some embodiments, the first label information comprises an identifier associated with a destination point corresponding to the item. In some embodiments, the update to the item information comprises at least one of a revised delivery address, a request to return the item to a sender, a request to change a standard of service associated with the item, and a condition notification associated with the destination point identifier. In some embodiments, the second label information comprises an identifier associated with a second destination point, and the electronic display of the dynamically configurable label discontinues displaying the first label information when the second label information is displayed. In some embodiments, the second label information comprises a notification associated with the item, and the electronic display of the dynamically configurable label continues displaying the first label information while the second label information is displayed. In some embodiments, the second label information comprises a textual message instructing a carrier of the distribution network to delay delivery of the item due to a weather condition at a destination point of the item, and the second label information is displayed simultaneously with the first label information. In some embodiments, the method further comprises causing the dynamically configurable label to produce at least one of an audio notification and a secondary visual notification associated with the label information update.

In another embodiment, a method for distributing items to recipients is described. The method comprises receiving, at a server of a distribution network, an initial label information for delivery of an item in the distribution network; associating the initial label information with a destination point identifier corresponding to a recipient associated with the item; transmitting, to a dynamically configurable label associated with the item, the initial label information and the destination point identifier such that the initial label information and the destination point identifier are stored in a memory of the dynamically configurable label; causing an electronic display of the dynamically configurable label to display the initial label information; receiving, into the distribution network, the dynamically configurable label affixed to the item; transporting the item to a unit delivery facility associated with the destination point identifier; and causing the electronic display of the dynamically configurable label to display the destination point identifier for delivery of the item to the recipient.

In some embodiments, the destination point identifier comprises a street address associated with the recipient. In some embodiments, the method further comprises preventing the electronic display of the dynamically configurable label from displaying the destination point identifier until a sender has deposited the item with the distribution network. In some embodiments, causing the electronic display to display the destination point identifier occurs based on the dynamically configurable label reaching a location within a predetermined radius of the a destination point identified by the destination point identifier. In some embodiments, the dynamically configurable label is configured to detect the location of the dynamically configurable label based on a GPS receiver within the dynamically configurable label, and causing the electronic display of the dynamically configurable label to display the destination point identifier occurs in response to the detected location of the dynamically configurable label.

BRIEF DESCRIPTION OF THE DRAWINGS

The foregoing and other features of the disclosure will become more fully apparent from the following description and appended claims, taken in conjunction with the accompanying drawings.

DETAILED DESCRIPTION

Figure 1A:
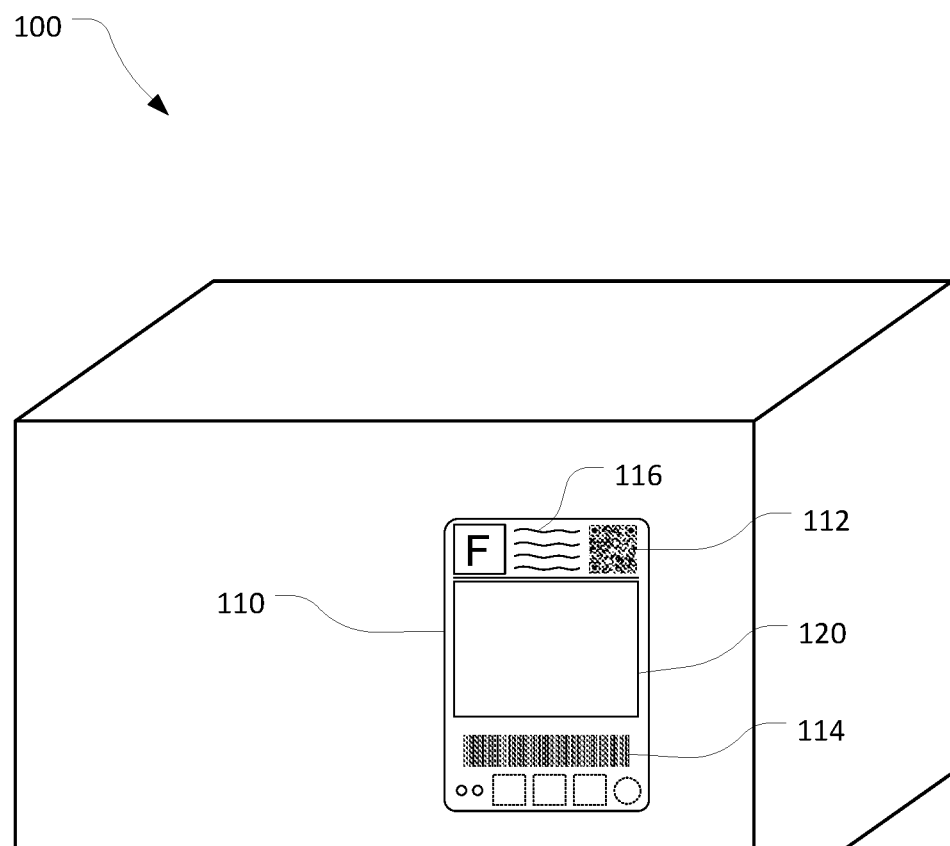
FIG. 1A is a perspective view of an item having an embodiment of a dynamically configurable label affixed thereto.

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

A distribution network generally transfers items from senders to recipients. The distribution network transfers an item from an entry or induction point where an item is received, to a destination point. In some embodiments, the destination point can be a location such as a delivery address (e.g., a residence, a business, etc.), or a unit delivery facility having receptacles associated with the recipient of the item. Between the entry or induction point and the destination point, an item may travel through one or more levels of the distribution network. For example, the distribution network may comprise regional distribution facilities, hubs, unit delivery facilities, and the like. For example, a nationwide distribution network may comprise one or more regional distribution facilities having a defined coverage area (such as a geographic area), designated to receive items from intake facilities within the defined coverage area, or from other regional distribution facilities. The regional distribution facility can sort items for delivery to another regional distribution facility, or to a hub level facility within the regional distribution facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the United States Postal Service, the unit delivery facility may be associated with a ZIP Code. The unit delivery facility receives items from local senders, and from hub level facilities or regional distribution facilities. The unit delivery may also sort and stage the items intended for delivery to destinations within the unit delivery facility's coverage area.

Accordingly, an item being transported within a distribution network may be transferred among one or more levels of the distribution network through one or more intermediate points according to a determined route for moving the item from one geographic location to another. The determined route may be determined at the time of induction, or shortly thereafter. In some embodiments, the determined route may be changeable while the item is being transferred. For example, the item may be received at a unit delivery facility or may be retrieved by a carrier at a delivery address. The item may be processed and/or sorted at the unit delivery facility and/or at one or more regional distribution facilities before being delivered to its destination point. The item can be processed and/or sorted based on a label affixed to the item, which may include human-readable and/or machine-readable item information such as an item identifier, a destination, a return address, a service standard, an intermediate destination, etc.

Existing labels for use in distribution networks typically are printed with an ink on paper and can display only static information, and thus may not be modifiable after an item is received within the distribution network. Issues such as an incorrectly written address, a desire to return an item to the sender or to send the item to a different destination point, a desire to change the speed of delivery or service class, weather, or other conditions affecting delivery at a destination point, or the like, may not be resolved, if at all, until the item reaches a recipient.

The present disclosure provides systems and methods for real-time or near real-time updates to a label affixed to an item being transported within a distribution network. Systems may include a dynamically configurable label including an electronic display configured to display any desired sequence of alphanumeric characters and/or symbols. Dynamically configurable labels may further include one or more remote communication interfaces, such that a command to update the displayed label information may be sent to the dynamically configurable label from a remote location, such as a server or other administrative computing device. Thus, a dynamically configurable label on an item may be updated in real time or while the item is moving within the distribution network at a time after induction, without requiring intervention by an agent of the distribution network. In some embodiments, a dynamically configurable label may allow for delivery of an item when an exact address is not known or associated with the item until the item has completed at least a portion of its transit through the distribution network. In some embodiments, the dynamically configurable label can maintain anonymity of a recipient, or can allow for the use of a vanity address, Intelligent Address™, or personal address on the label at induction or deposit for sending. The dynamically configurable label can be changed to a delivery point recognizable to a delivery resource, such as a street address. The dynamically configurable label can be changed after induction, or at any point in the distribution network before the carrier receives the item for delivery.

In some embodiments, the dynamically configurable labels described herein may be implemented with an LCD, OLED, electronic ink, and the like. In some embodiments, "e-ink" displays, also known as electronic paper or "e-paper," may have several advantageous features for the implementations disclosed herein. For example, electronic ink displays are typically lightweight and flexible, allowing them to be applied to items similarly to existing adhesive or tape-affixed labels, and to avoid breaking during handling, processing, or transit. In another example, electronic ink displays have very low power requirements, typically requiring power only when actively changing the information displayed; once a charge has been applied to display a particular item of information on the display, the e-ink does not require a continuous power supply to continue displaying the item of information. Accordingly, an electronic ink display may be used to display messages, notifications, addresses, or other items of information that may change several times during an item's transit within the distribution network, requiring only a small power supply in order to reduce weight and cost.

In some aspects of the present disclosure, a dynamically configurable label may be able to receive remote updates to the displayed label information. For example, after sending an item, a sender or recipient, or the distribution network, may wish to change the delivery address (e.g., due to an error in providing the address initially, a payment failure by the recipient, vanity address use, etc.). In one case, the sender may provide an updated delivery address (e.g., by providing the updated address to via an application, interface, or portal of the distribution network, etc.). The updated delivery address may be sent from a server or other distribution network computing device to the dynamically configurable label, such as by wireless internet, a cellular network, or the like. When the update is received at the dynamically configurable label, the new delivery address and/or a new computer readable code is displayed on the electronic ink display such that the item is redirected toward the new address at the next sorting or processing event. Similar updates may be initiated by the distribution network itself. For example, if it is determined that a severe weather alert has been issued for the delivery location on the day of expected delivery, the distribution network may cause the dynamically configurable label to display a notification that the item should be held for an extra day and placed into the following day's delivery so as to avoid delivery during a severe weather event.

In some aspects of the present disclosure, a dynamically configurable label may be able to locally receive and/or generate updates to the displayed label information. In one example, an item contains temperature-sensitive contents (e.g., a perishable item sent with a refrigerant such as dry ice, or other coolant or refrigerant). A temperature sensor within the item may be in wired or wireless communication with the dynamically configurable label such that the temperature sensor can send an alert to the dynamically configurable label if the temperature within the item exceeds a predetermined threshold, or if the temperature is predicted to exceed a predetermined threshold. Thus, if it is determined that the temperature will exceed the threshold, the dynamically configurable label may display a notification to cause the item to be redirected to a nearby hub, regional distribution facility, or unit delivery facility where the temperature control issue may be resolved (e.g., by adding a refrigerant or coolant to the item, placing the item into cold storage, notifying a recipient, etc.), or may automatically upgrade the service class of the item to a higher priority such that the item arrives at its destination before the temperature exceeds the threshold.

In some aspects of the present disclosure, dynamically configurable labels may be used to implement conditional or sequential delivery instructions. A recipient may establish a "vanity address" or other recipient-specific addressing phrase that may differ from the actual address of a destination point where the recipient receives items from the distribution network. For example, the recipient may be a celebrity or other entity wishing to avoid publicly disclosing a street address. In this case, the recipient may provide to the distribution network an item of initial label information (e.g., a phrase associated with the recipient) to be correlated with the actual address. A sender wishing to send an item to the recipient may then send an item through the distribution network using only the item of initial label information associated with the recipient. After the item has been received at an induction point, the display on the dynamically configurable label may update at some point before delivery to replace the initial label information with updated label information including the actual address for delivery. For example, the label may detect when it is scanned upon arrival at a unit delivery facility prior to being assigned to or taken by a carrier for delivery, and update the display to reflect the actual address for delivery. Thus, the dynamically configurable label can allow an item carrier to see the correct delivery address while delivering the item, without requiring the delivery address to be made known to senders.

In some embodiments, the dynamically configurable labels described herein can be configured to aid in real-time tracking of items. In one example, a dynamically configurable label with mobile internet and/or cellular network connectivity may send a reporting signal to a server associated with item tracking, based on an event detected at the label. For example, a reporting signal may be sent when the item is processed at a particular piece of processing equipment, when the item enters a predetermined geographic region (e.g., "geo-fencing"), when the item is scanned upon arrival at a destination point, when the label is queried for a status update by a remote computing system, etc. In some embodiments, the reporting signal may be combined with a real-time geographic location of the label. For example, the label may detect a delivery scan (e.g., by receiving an NFC or other wireless communication from a handheld carrier device executing the delivery scan), and may responsively send a reporting signal including an indication of the delivery scan and GPS coordinates corresponding to the label's location at the time of the delivery scan. The distribution network may use the GPS coordinates to verify that the delivery scan occurred at the correct location.

As used herein, the term "item" may refer to an individual article, object, agglomeration of articles, or container having more than one article within, in a distribution network. The item may be a letter, magazine, flat, luggage, package, box, or any other item of inventory which is transported or delivered in a distribution system or network. The term "item" may also refer to a unit or object which is configured to hold one or more individual items, such as a container which holds multiple letters, magazines, boxes, etc. The term item may also include any object, container, storage area, rack, tray, truck, train, car, airplane, or other similar device into which items or articles may be inserted and subsequently transported, as are commonly used in distribution systems and networks.

FIG. 1A is a perspective view of an item 100 having a dynamically configurable label 110 affixed thereto. The item 100 may be, for example, a box, a package, or any other item that can be transported or delivered in a distribution network. The dynamically configurable label 110 includes static information, which may include one or more items of machine-readable information (e.g., a QR code 112 and/or a barcode 114, which may include indicia of postage) and/or one or more items of human-readable information (e.g., an address 116 and/or other alphanumeric or symbolic characters). The static information may be applied to the dynamically configurable label 110 by any suitable method, such as by printing, writing, application of one or more adhesive labels, or the like. In some embodiments, the static information on the dynamically configurable label 110 may include sufficient information to provide for delivery of the item in the event of failure of the display or other electronic components of the dynamically configurable label 110.

The dynamically configurable label 110 further includes a display 120. The display may be any type of flat display, for example, electronic paper, LCD, IPS, LED, OLED, AMOLED, or the like. In some embodiments, the display 120 may be an electronic paper display configured to display information using electronic ink. The information displayed on the display 120 may include any combination of machine-readable and/or human-readable information. As will be described in greater detail, the display 120 may display various types of information such as delivery point information, intermediate delivery information, notifications, alerts, and/or any other supplemental content in addition to the static information. In some embodiments, the dynamically configurable label 110 does not include any static information 112, 114, 116, and all information, including some or all information depicted in static information 112, 114, 116, is displayed on the display 120 using electronic ink.

Figure 1B:
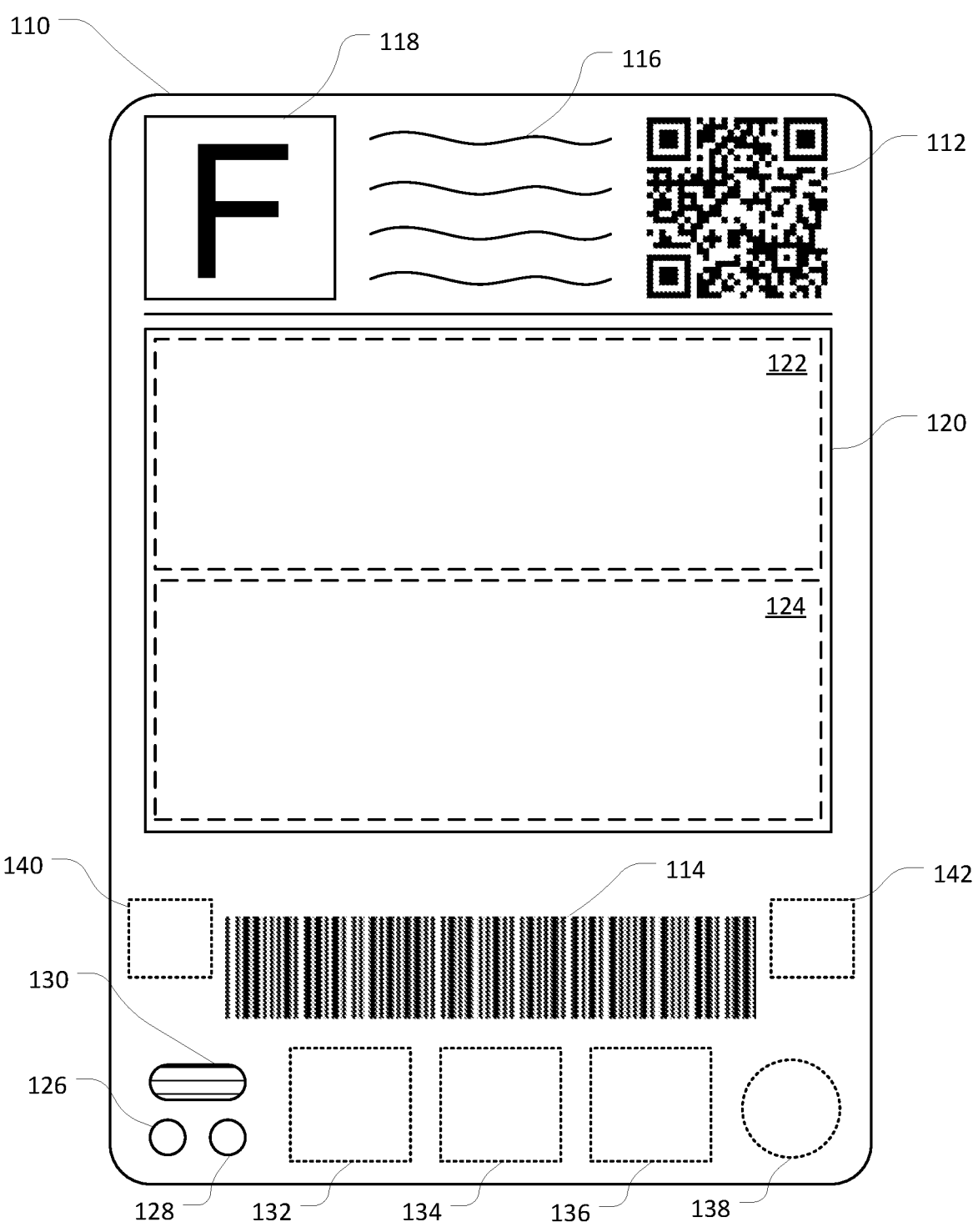
FIG. 1B is a front elevation view of an embodiment of a dynamically configurable label.

FIG. 1B is a front elevation view of a dynamically configurable label 110. The dynamically configurable label

110 includes static information such as machine-readable information (e.g. a QR code 112, a barcode 114, etc.) and human-readable information (e.g., an address 116 or other text, a service standard indicator 118, etc.). The dynamically configurable label 110 further includes a configurable display 120 for displaying dynamic or changeable information. In some embodiments, the display 120 is configured to display information in two or more subdivided portions, such as a notification region 122 and a routing information region 124. Additional components of the dynamically configurable label 110 may include a secondary visual indicator 126, an input 128, an audio indicator 130, a processor 132, a network communication module 134, a GPS receiver 136, and a power supply 138. The processor 132, the network communication module 134, the GPS receiver 136, and the power supply 138 are shown in dashed lines; the dashed lines do not indicate the location of these components within the dynamically configurable label 110, but are for illustration only. The dynamically configurable label 110 need not include static information items 112, 114, 116, 118. In some embodiments, the dynamically configurable label 110 does not include any static information and all information for the item is displayed on the display 120.

The display 120 is disposed along at least a portion of an exterior surface of the dynamically configurable label 110, and is sized to legibly display one or more items of label information. As described above, the display may be any type of flat display, for example, electronic paper, LCD, IPS, LED, OLED, AMOLED, or the like. In one example, the display 120 is a thin electronic paper display using electronic ink. In some embodiments, a thin electronic paper display 120 may be flexible enough to permit bending of the dynamically configurable label 110 without damaging the display 120. In addition, electronic ink may generally use power only when changing the information displayed, rather than continuously using power, advantageously reducing the amount of electrical power required to display label information. Electronic ink may have the additional advantage of allowing the content displayed on the display 120 to remain even if electrical power is lost.

In some embodiments, the display 120 may be configured to present label information in two or more predetermined subdivided portions of the display 120. The predetermined subdivided portions of the display may make up all or less than all of the display 120. In one non-limiting example, the two predetermined subdivided portions include the notification region 122 and the routing information region 124. In this example, one or both portions may display label information as appropriate. For example, an alert message such as "SERVICE STANDARD IN JEOPARDY" or "SEVERE WEATHER AT DESTINATION" may be displayed in the notification region 122, while routing information in the routing information region 124 may provide an alternative or updated destination point or intermediate point to which a person (e.g., an item carrier) or machine (e.g., a sorting machine) should direct the item. In some embodiments, the notification region 122 and/or the routing information region 124 may display information such as the machine-readable information 112, 114, and/or the human-readable information 116, 118.

The secondary visual indicator 126 may be, for example, a light source such as a light emitting diode (LED), light bulb, or other switchable light source. In some embodiments, the secondary visual indicator 126 may be switchable between on and off modes, and/or may be switchable between two or more different colors of light. The secondary visual indicator 126 may be operable under control of the processor 132 or other component to provide visual alerts in addition to or instead of label information displayed on the display 120. In one example, the secondary visual indicator 126 may include an LED configured to blink intermittently when an alert is displayed on the display 120 in order to more effectively attract the attention of a nearby person (e.g., an item carrier of the distribution network). In some embodiments, a multi-color secondary visual indicator 126 may be selectively controlled to display a color corresponding to a status of the item. For example, the secondary visual indicator 126 may steadily or intermittently display a green color to indicate a normal condition, and may steadily or intermittently display a red color to indicate an abnormal condition, an alert, or other condition requiring attention.

The audio indicator 130 may be a speaker, piezoelectric horn, or other suitably sized sound generation device. The audio indicator 130 may be operable under control of the processor 132 or other component to provide audible alerts in addition to or instead of label information displayed on the display 120. In some embodiments, the audio indicator 130 may be configured to operate in conjunction with the secondary visual indicator 126. For example, when an alert or other notification is displayed at the display 120 and/or at the secondary visual indicator 126, the audio indicator 130 may emit a sound such as a beep, chirp, tone, verbal recorded message, or other sound to further attract the attention of a nearby person. The audio indicator 130 may be operable simultaneously with and/or independently of the secondary visual indicator 126. For example, some notification types (e.g., high priority notifications) may be associated with both a secondary visual notification and an audio notification, while certain other notification types (e.g., lower priority notifications) may be associated with either a secondary visual notification or an audio notification. In some embodiments, a sound produced at the audio indicator 130 may be used to assist in location of an item. For example, a continuous or repeated sound may be played at the audio indicator 130 to assist a carrier of a distribution network in locating an item to which the dynamically configurable label 110 is affixed, especially where the item is located among a number of other items such that the item is not readily distinguishable by sight alone.

The input 128 may include any type of tactile sensor, such as a button, capacitive touch sensor, piezoresistive sensor, piezoelectric sensor, elastoresistive sensor, or any other suitable input device capable of receiving an input from a user (e.g., a carrier of the distribution network). In some embodiments, the input 128 may include a plurality of tactile sensors, such as binary option buttons (e.g., Yes/No), arrow keys for selecting an option from a plurality of options presented at the display 120, or one or more alphanumeric character input buttons. The input 128 may be provided for a variety of purposes. In some embodiments the input 128 may be a single button or touch sensor provided for acknowledging and/or dismissing pending alerts. For example, touching or depressing the input 128 may stop blinking or beeping of the secondary visual indicator 126 or audio indicator 130 after an item carrier has read a notification from the display 120. In another example, in the case of a predetermined sequence of label configurations (described in greater detail below with reference to FIG. 6), the input 128 may allow an item carrier to manually advance the display 120 to a subsequent label configuration if the display 120 has failed to update automatically.

The processor 132 includes one or more electronic circuitry components configured to monitor and/or control the other components of the dynamically configurable label 110.

The processor 132 may include one or more central processing units, microprocessors, microcontrollers, or the like. The processor 132 is in communication with the memory 140, which may be any type of computer memory. For example, the memory 140 may include one or more solid state storage media. The memory 140 is configured to store information under control of the processor 132. In some embodiments, the memory 140 may be configured to store data such as item information corresponding to the item to which the dynamically configurable label 110 is affixed, label information to be presented at the display 120, data received from one or more other devices via the network communication module 134 and/or the local communication module 142, location information received from the GPS receiver 136, etc.

The network communication module 134 and the local communication module 142 include electronic circuitry configured to communicate with one or more outside components by wired or wireless communication. The network communication module 134 is configured to communicate with remote systems, such as one or more servers or databases of the distribution network which may be in one or more locations relatively distant from the dynamically configurable label 110. Thus, the network communication module 134 may communicate via any suitable network communication method such as Wi-Fi, LTE, LAN, cellular network, or any other suitable communication method. In one example, the network communication module 134 may be configured to receive updated item information and/or label information transmitted from a distribution network server over a cellular or mobile data network. The local communication module 142 is configured to communicate with nearby systems by wired and/or wireless communications. For example, the local communication module 142 may include one or more of a near-field communication (NFC) device, a radio-frequency identification (RFID) device, a Bluetooth transceiver, or the like. In one example, the local communication module 142 may be configured to receive, from a handheld device carried by an item carrier or other employee of a distribution network, a signal associated with an event such as a delivery scan, notification acknowledgement, or the like. In another example, the local communication module 142 may be configured to receive, from a sorting device or other item processing equipment at an entry point or intermediate point, a signal notifying the dynamically configurable label 110 of the completion of the sorting or processing, or of the location of the item. In a further example, the local communication module 142 may be configured to communicate with a temperature sensor within the item 100, such as to receive notifications related to the temperature of temperature-sensitive contents within the item 100.

The GPS receiver 136 comprises a GPS chip or other electronic circuitry operable to receive a global positioning signal and determine location information of the dynamically configurable label 110 based on the global positioning signal. The GPS receiver 136 is in electronic communication with the processor 132 such that that the GPS receiver 136 can send location information to the processor 132. The processor 132 can control the GPS receiver 136, such as to cause the GPS receiver 136 to send the location information to the processor 132. In one example implementation, the processor 132 may request location information from the GPS receiver 136 in response to receiving an indication associated with a delivery scan (e.g., based on a signal received at the local communication module 142), and may store the location information associated with the delivery scan in the memory 140. In addition, the processor 132 may further cause the delivery scan location information to be transmitted by the network communication module 134 to a remote server of the distribution network in accordance with a tracking or delivery verification program. In another example, the GPS receiver 136 may operate in conjunction with the processor 132 to determine the position of the dynamically configurable label 110 relative to a geofence or other geographic location or boundary.

The power supply 138 can be included in the dynamically configurable label 110 to provide electrical power to any or all of the electronic components therein. The power supply 138 may include one or more of a single-use battery, a rechargeable battery, a solar cell or other photovoltaic device, or the like. In some embodiments, various electronic components depicted in FIG. 1B may not be included. For example, the dynamically configurable label 110 may not include any or all of the secondary visual indicator 126, input 128, audio indicator 130, GPS receiver 136, or local communication module 142. The dynamically configurable label 110 may be implemented with any combination or subcombination of the components illustrated in FIG. 1B, and/or in the absence of any of the components illustrated therein, without departing from the spirit or scope of the present disclosure.

Figure 1C:
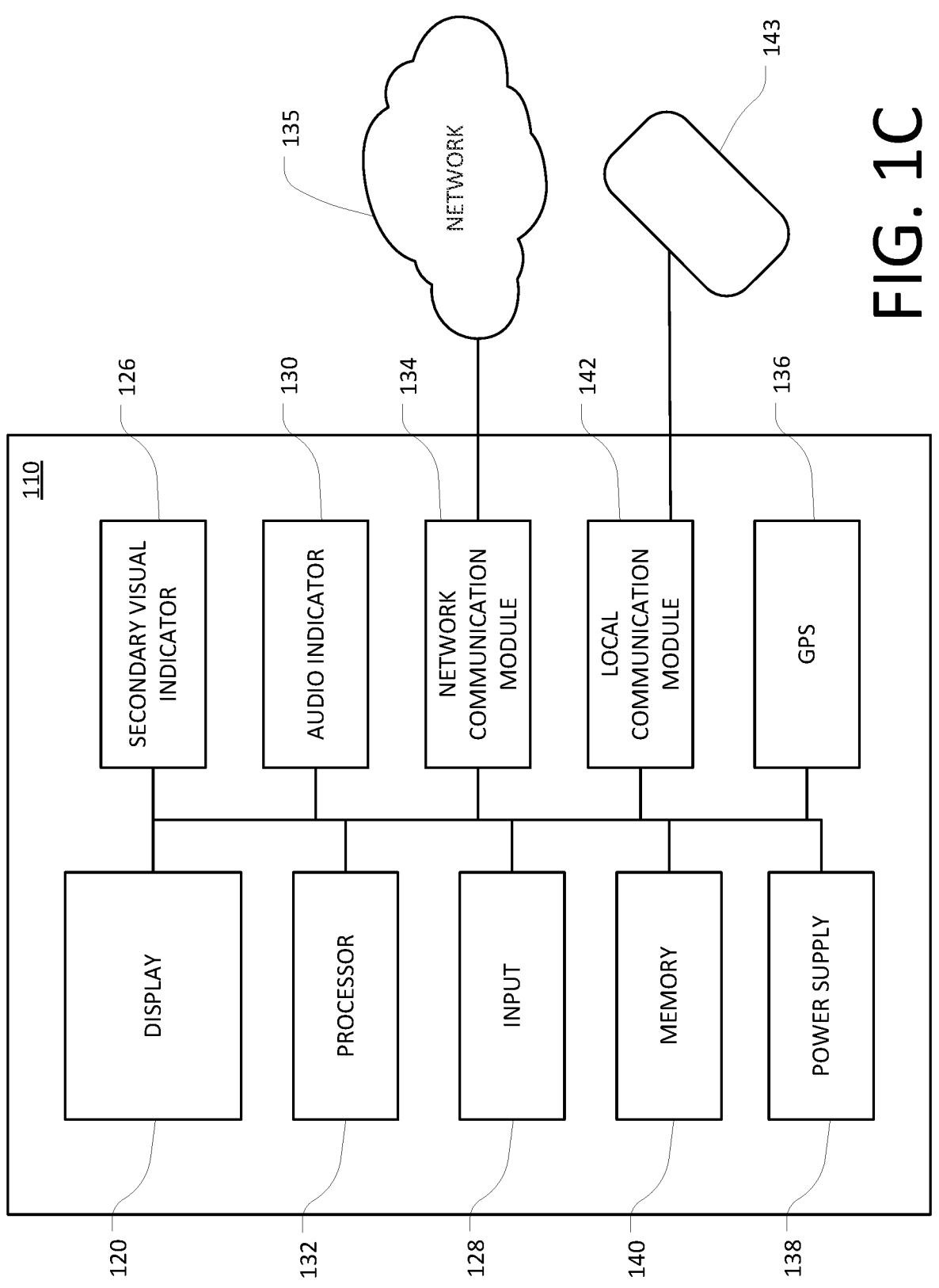
FIG. 1C is a block diagram of an embodiment of a dynamically configurable label.

FIG. 1C is a block diagram schematically illustrating the electronic components of the dynamically configurable label 110. As shown in FIG. 1C, the processor 132 is in electrical communication with the display 120, the secondary visual indicator 126, the audio indicator 130, the input 128, the network communication module, the memory 140, the local communication module 142, the GPS receiver 136, and the power supply 138. The network communication module is additionally configured to communicate externally with other components of the distribution network via a network 135 by wired and/or wireless communication methods (e.g., Wi-Fi, LTE, LAN, cellular network, or any other electronic communication method). The local communication module 142 is configured to communicate externally with one or more communication devices 143 located near the dynamically configurable label 110, such as a handheld device or mail processing equipment, by wired and/or wireless communication methods (e.g., NFC, Bluetooth, BLE, RFID, or any other local communication method). Although the various electronic components of the dynamically configurable label 110 are depicted in FIG. 1C as being connected by a common bus, it will be understood that one or more of these electronic components may be electrically connected to the processor 132 while not being electrically connected to one or more other components of the dynamically configurable label 110.

Figure 2:
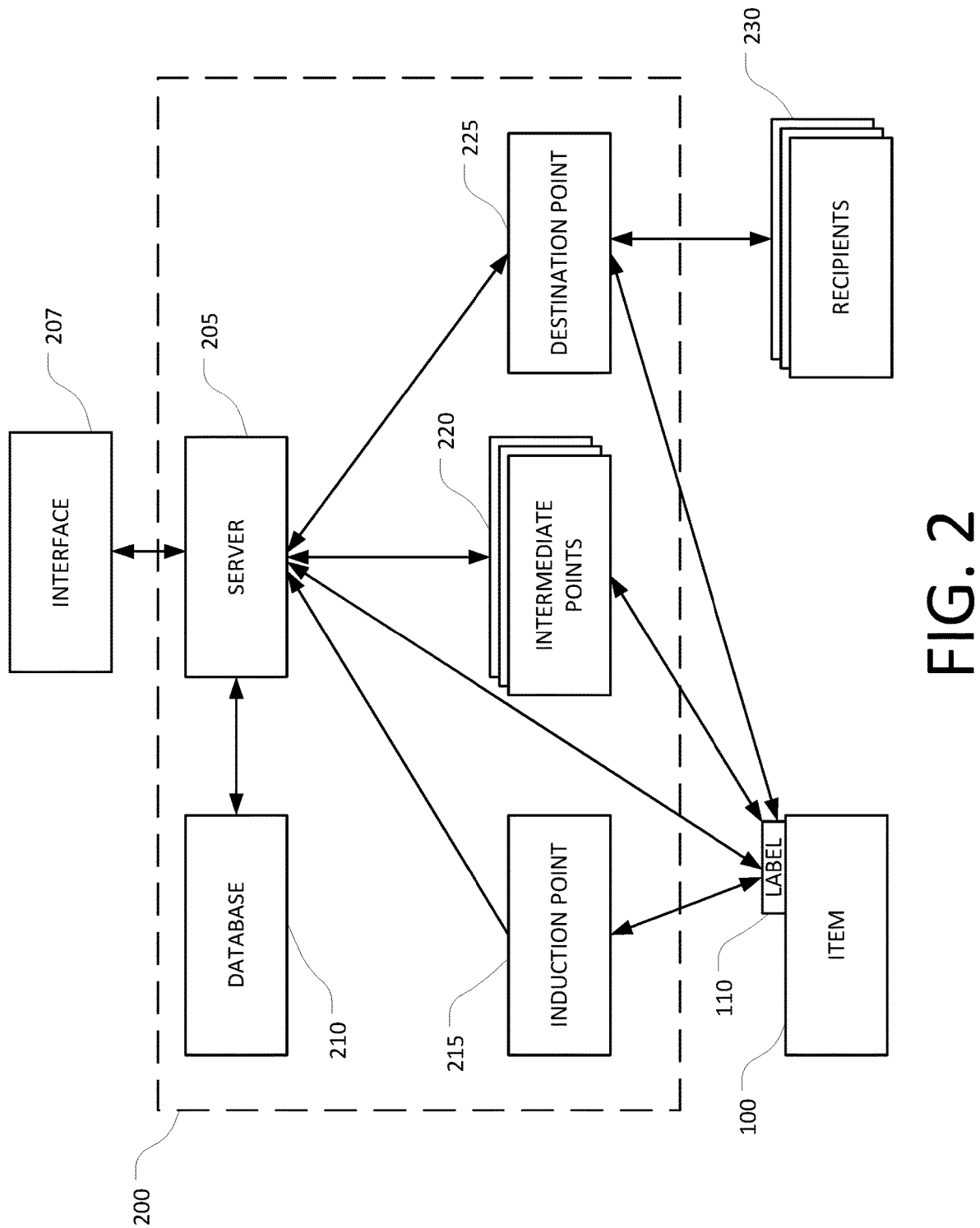
FIG. 2 is a schematic illustration of an embodiment of an item distribution network including dynamically configurable labels.

FIG. 2 is a block diagram schematically illustrating a distribution network 200 for distribution of items 100 including dynamically configurable labels 110. The distribution network 200 includes a server 205, a database 210, at least one induction point 215, one or more intermediate points 220, and at least one destination point 225. The dynamically configurable labels 110 facilitate the transfer, at least partially under control of the server 205, of items 100 from the induction point 215 to recipients 230 via the destination point 225. The item 100 and dynamically configurable label 110 may be, for example, the item 100 and dynamically configurable label 110 described above with reference to FIGS. 1A-1C.

Induction points 215 in the distribution network may include any location and/or facility at which an item 100 may be received for transportation in the distribution network. For example, an induction point 215 may include one or more of a unit delivery facility, such as a post office, a drop box, a residence and/or portion of a residence such as a porch or mailbox, a place of business and/or portion of a place of business such as a mailroom or mailbox, or other location. Some induction points 215, such as a unit delivery facility, may include sorting and/or processing equipment configured to interact with and/or detect a dynamically configurable label 110. In some induction points 215, interaction with the dynamically configurable label 110 may be achieved with a handheld device carried by an agent of the distribution network retrieving the item 100 from the induction point 215.

Similarly, destination points 225 in the distribution network may include any location and/or facility at which an item 100 may arrive and be transferred to a recipient 230 from the distribution network. For example, a destination point 225 may include one or more of a unit delivery facility, a distribution network facility, a drop box, a residence and/or portion of a residence such as a porch or mailbox, a place of business and/or portion of a place of business such as a mailroom or mailbox, or other location. Some destination points 225, such as a distribution network facility, may include sorting and/or processing equipment configured to interact with and/or detect a dynamically configurable label 110. In some destination points 225, interaction with the dynamically configurable label 110 may be achieved with a handheld device carried by an agent of the distribution network delivering the item 100 to the induction point 215.

The intermediate points 220 may include any location, facility, and/or vehicle where an item 100 may arrive and be sorted, scanned, handled, processed, transported, or otherwise interacted with along the trip from the induction point 215 to the destination point 225. For example, intermediate points 220 may include one or more unit delivery facilities, regional distribution facilities, hubs, etc. The number and location of intermediate points 220 may vary depending on the locations of and distance between the induction point 215 and the destination point 225 for a particular item 100. In one example, the induction point 215 is a unit delivery facility, and the destination point 225 is a residence in the same city. In this example, there may be only one intermediate point 220, such as a different unit delivery facility in the same city having a delivery area encompassing the destination point 225. Alternatively, if the destination point is located within the delivery area of the induction point 215 unit delivery facility, there may be no intermediate points 220. In another example, the induction point 215 is a place of business, and the destination point 225 is a residence located across the country relative to the induction point 215. In this example, the item 100 may travel through a number of intermediate points 220, such as a unit delivery facility near the induction point 215, a regional distribution facility associated with the unit delivery facility, one or more hubs, a second regional distribution facility associated with the destination point 225, and a second unit delivery facility associated with the destination point 225.

The server 205 and database 210 may each include one or more computing devices located in one or more facilities of the distribution network 200. For example, each of the server 205 and the database 210 may be located at an induction point 215, an intermediate point 220, a destination 225, and/or at any other facility, such as a remote server facility or the like. The database 210 is in communication with the server 205 such that data sent from the server 205 may be received and stored at the database 210. Data requested by the server 205 may be sent from the database 210 to the server 205. The server 205 is configured to communicate over one or more wired or wireless networks with some or all induction points 215, intermediate points 220, and/or destination points 225 in the distribution network 200. The server 205 is further configured to communicate with the dynamically configurable label 110, for example, by sending data to and/or receiving data from the network communication module 134 of the dynamically configurable label 110, as described above with reference to FIGS. 1B and 1C. The server 205 can receive data (e.g., item information, label information, payment information, etc.) from one or more interfaces 207, such as user interfaces, remote computing systems, cloud-based computing systems, e-commerce platforms, or other interfaces, any of which may be disposed within or external to the distribution network 200.

The dynamically configurable label 110 may additionally be configured to communicate with some or all of the induction point 215, intermediate points 220, and/or destination point 225, directly and/or through the server 205 as an intermediary. As will be described in greater detail, interactions between the dynamically configurable label 110 and the induction point 215, intermediate points 220, and/or destination point 225 corresponding to a routing of the item 100 from the induction point 215 to the destination point 225 may be used to update information displayed by the display 120 (FIGS. 1A-1C) of the dynamically configurable label 110, modify the routing of the item 100, update a tracking status of the item 100, or for other purposes.

At the time of induction at its induction point 215, an item 100 and/or a dynamically configurable label 110 affixed to the item 100 may be associated with item information including, for example, an item identifier, a label identifier, an induction point identifier, a destination point identifier, routing information corresponding to one or more intermediate points 220, sender information, recipient information, a service standard or class, label information to be displayed on a display 120 of the dynamically configurable label 110, and/or any other information associated with the item 100. Some or all of the item information may be stored in the memory 140 of the dynamically configurable label 110 and/or in the database 210 of the delivery network 200. As will be described in greater detail with reference to FIGS. 3-6, the item information stored in the dynamically configurable label 110 and/or the database 210, as well as additional information obtained during the transit of the item 100 through the distribution network 200, may be used to apply real-time or nearly real-time updates to the information displayed on the dynamically configurable label 110. In some embodiments, the dynamically configurable label 110 may be affixed to an item 100 such as a container, bin, pallet, or the like containing other items, for inter-facility use within the distribution network, and accordingly may not have an induction point 215. Instead, an item container may have an origination and a destination (e.g., hubs, regional distribution facilities, or unit delivery facilities) within the distribution network.

Figure 3:
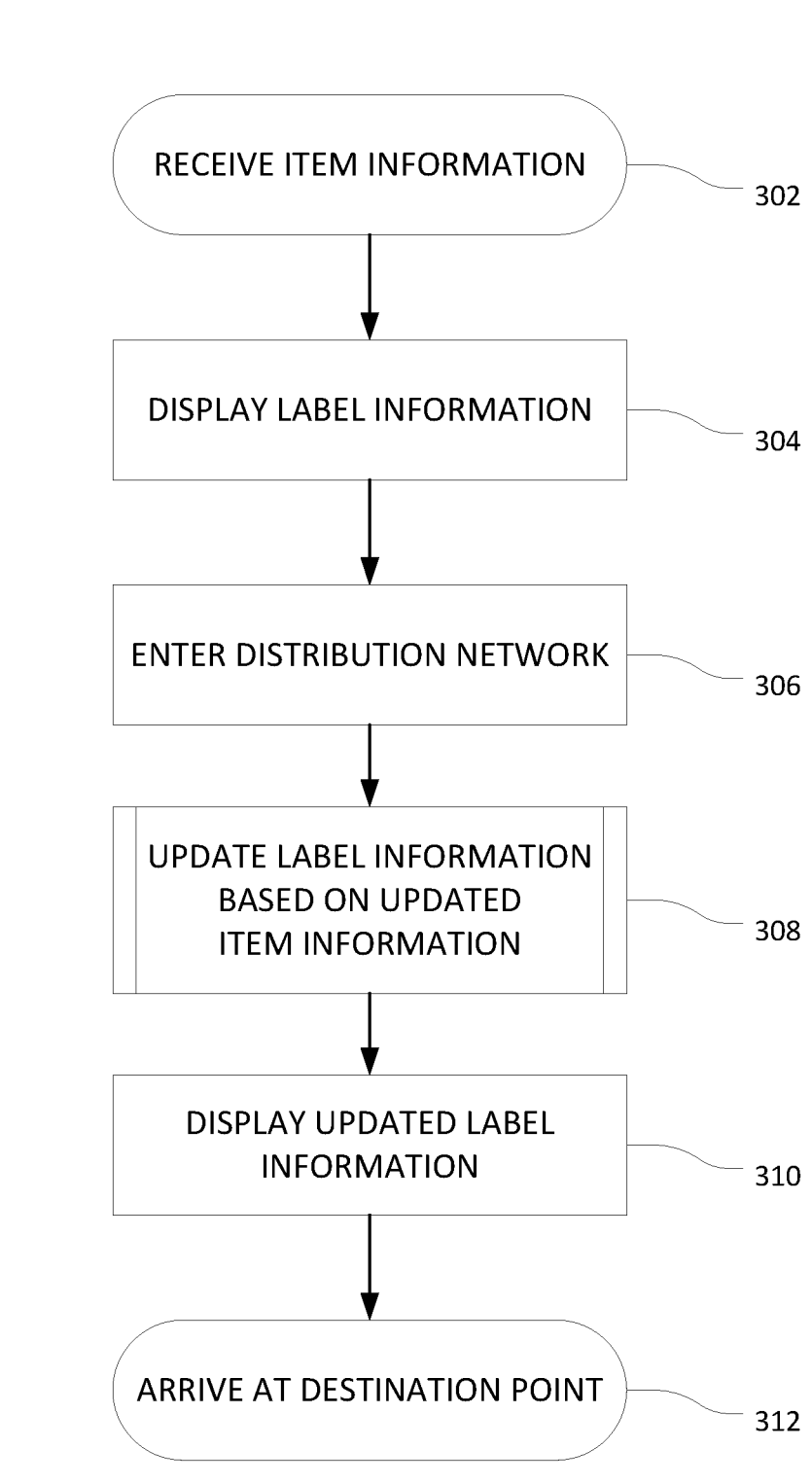
FIG. 3 is a flowchart illustrating an exemplary method of delivering an item with a dynamically configurable label.

FIG. 3 is a flowchart illustrating an exemplary method 300 of delivering an item with a dynamically configurable label 110. The method 300 can be implemented to provide predetermined and/or real-time updates to a dynamically configurable label 110 for improved transportation within a delivery network 200. The method 300 can be performed by a computer system integrated within a system such as the distribution network 200 described herein. For example, the method 300 can be performed at least in part by components such as the dynamically configurable label 110, alone or in conjunction with one or more external computer components such as a server 205 and/or a database 210 of the distribution network 200. It will be appreciated that some or all steps of the method 300 can be performed locally and/or remotely. For example, in some embodiments the entire method 300 can be performed by a dynamically configurable label 110 based on information and computer executable instructions stored within the memory 140 of the dynamically configurable label 110, or the method 300 can be performed by a combination of the dynamically configurable label 110 and the server 205 at least partly based on information and/or computer executable instructions stored within a remote memory such as the database 210.

The method 300 begins at block 302 when the dynamically configurable label 110 receives item information, such as from the interface 207. The item information may be received, for example, at or near the time when the dynamically configurable label 110 is affixed to an item 100 to be transported in the distribution network 200. For example, the dynamically configurable label 110 may be affixed by an agent of the distribution network at a unit delivery facility upon receiving the item 100 and item information. In another example, the dynamically configurable label 110 may be affixed at a residence or place of business, by a sender who provides the item information to the database 210 (e.g., through an e-commerce site, web portal, mobile application, etc., associated with the distribution network). The item information may be sent to the database 210, and may be manually and/or automatically transmitted from the server 205 to the dynamically configurable label 110, where it can be received and stored in the memory 140. When the item information has been received at the dynamically configurable label 110, the method 300 continues to block 304.

At block 304, label information is displayed. The label information may be information that was included in the item information received at the dynamically configurable label 110 at block 302, and/or may be transmitted to the dynamically configurable label 110 by mail processing equipment or via the interface 207. In some embodiments, the label information may include multiple items of label information to be displayed simultaneously and/or sequentially. For example, the label information may include both a notification and a routing location to be displayed at the same time on the display 120. In another example, the label information may include a first routing location to be displayed on the display 120 until an event or input is detected (e.g., a processing event, detected location, or manual input at input 128), and a second routing location to be displayed on the display 120 following the detected event or input. The routing location component of the label information may be, for example, an address or other identifier corresponding to the destination point 225 for the item 100, an address or other identifier corresponding to a planned intermediate point 220 for the item 100, etc. In some embodiments, the label information may include a machine-readable code corresponding to a determined routing plan for the item. When the label information has been displayed, the method 300 continues to block 306.

At block 306, the dynamically configurable label 110, along with the attached item 100, enters the distribution network 200. For example, the item 100 and the dynamically configurable label 110 may be received at the induction point 215 by an agent of the distribution network 200. In the distribution network 220, the item may be processed, sorted, transferred, or otherwise transported along a route from the induction point 215 to the destination point 225 as described elsewhere herein. When the dynamically configurable label 110 has entered the distribution network, the method 300 continues to sub-process 308.

At sub-process 308, the label information is updated based on updated item information. Additional or updated item information, including new or updated label information to be displayed at display 120, may be received at the dynamically configurable label 110. For example, the updated item information may be received from the processor 205 (e.g., after being received at the processor from a shipper, recipient, or other via the interface 207) at the network communication module 134 via the network 135. In another example, the updated item information may be received from a nearby device such as a handheld device used by an agent of the distribution network 200, via the local communication module 142. Updating of label information based on updated item information is described in greater detail below with reference to FIGS. 4 and 5. When the label information has been updated based on updated item information, the method 300 continues to block 310.

At block 310, the updated label information is displayed at the display 120. For example, in sub-process 308 the updated item information including new or updated label information may have been received at the network communication module 134 or the local communication module 142 and stored in the memory 140 under control of the processor 132. In block 310, the processor 132 may cause the updated label information stored in the memory 140 to be displayed on the display 120. In some embodiments, the dynamically configurable label 110 may also provide a secondary visual or audio alert when the updated label information is displayed. For example, the processor 132 may cause the secondary visual indicator 126 (e.g., an LED or other light source) to display steady, blinking, or intermittent light to alert a carrier or other nearby agent of the distribution network 200 of the updated label information. In another example, the processor 132 may cause the audio indicator 130 (e.g., a speaker or piezoelectric horn) to play a steady or intermittent tone (e.g., beeping or the like) to similarly alert a nearby agent. In some embodiments, the secondary visual or audio alert may continue indefinitely or may be terminated in response to an input at the input 128 and/or when a predetermined alert time period has elapsed (e.g., the alert may stop automatically after 10 seconds, 30 seconds, etc.). When the updated label information has been displayed, the method 300 continues to block 312.

At block 312, the method 300 terminates as the dynamically configurable label 110 and corresponding item 100 arrive at a destination point 225. In some cases, the arrival of the item 100 at the destination point 225 may have been facilitated by the updated label information. In one example, a sender of the item may have requested that the item 100 not be delivered unless its recipient 230 is present to receive the item 100 in person. In this example, the updated label information may include an indication that the recipient 230 is at the destination point 225 and/or a time window during which the recipient 230 will be at the destination point 225. Accordingly, an item carrier may see the updated label information and, in response, delay or prioritize delivery of the item 100 to arrive during the time window. In another example, the destination point 225 may be different from an originally planned destination point 225. For example, the updated label information may have been updated due to an error in an original destination address, a latent condition such as a severe weather warning at the originally planned destination point 225, or the like. In this case, the updated label information may substitute the address of a nearby unit delivery facility for the address of the originally planned destination point 225, where the item 100 may be retrieved by the recipient 230. Additional examples of improved delivery based on updated label information will be described with reference to FIGS. 4 and 5.

In some embodiments, the dynamically configurable label 110 is used only within the distribution network, in which case, an item, container, etc., on which the dynamically configurable label 110 is to be used need not be inducted into the distribution network from an outside sender, shipper, or other source. For example, the distribution network may use dynamically configurable labels 110 on containers, pallets, bins, carts, rolling stock, or other items moved within the distribution network. The containers, pallets bins, etc., can have a dynamically configurable label 110 attached thereto or placed thereon, which contains instructions and/or a destination to which the container, bin, pallet, etc., is to be transported. In the case of the USPS, the dynamically configurable label 110 can act as an MTEL placard identifying the next destination for the item. When the container, bin, pallet, etc., arrives at the next facility within the distribution network, the dynamically configurable label 110 can be reset, and a new destination for the container, pallet, etc., can be sent to the dynamically configurable label 110 indicating the next destination.

In some embodiments, the dynamically configurable label 110 can be configured to be changed when the item passes through a scanning area in a distribution network facility. For example, within a distribution network facility, there can be doorway scanners, area scanners, etc., which scan items as they move from one area of the facility to the next, such as from a processing area to a dock area, or from a dock area onto a truck, etc. Passive or active scanners can be positioned at transistion areas to scan and track items as they move in the network. When the dynamically configurable label 110 passes through or by such a scanner, or when a scanner signal is detected at the dynamically configurable label 110, the dynamically configurable label 110 can update automatically in response to the signal.

Figure 4:
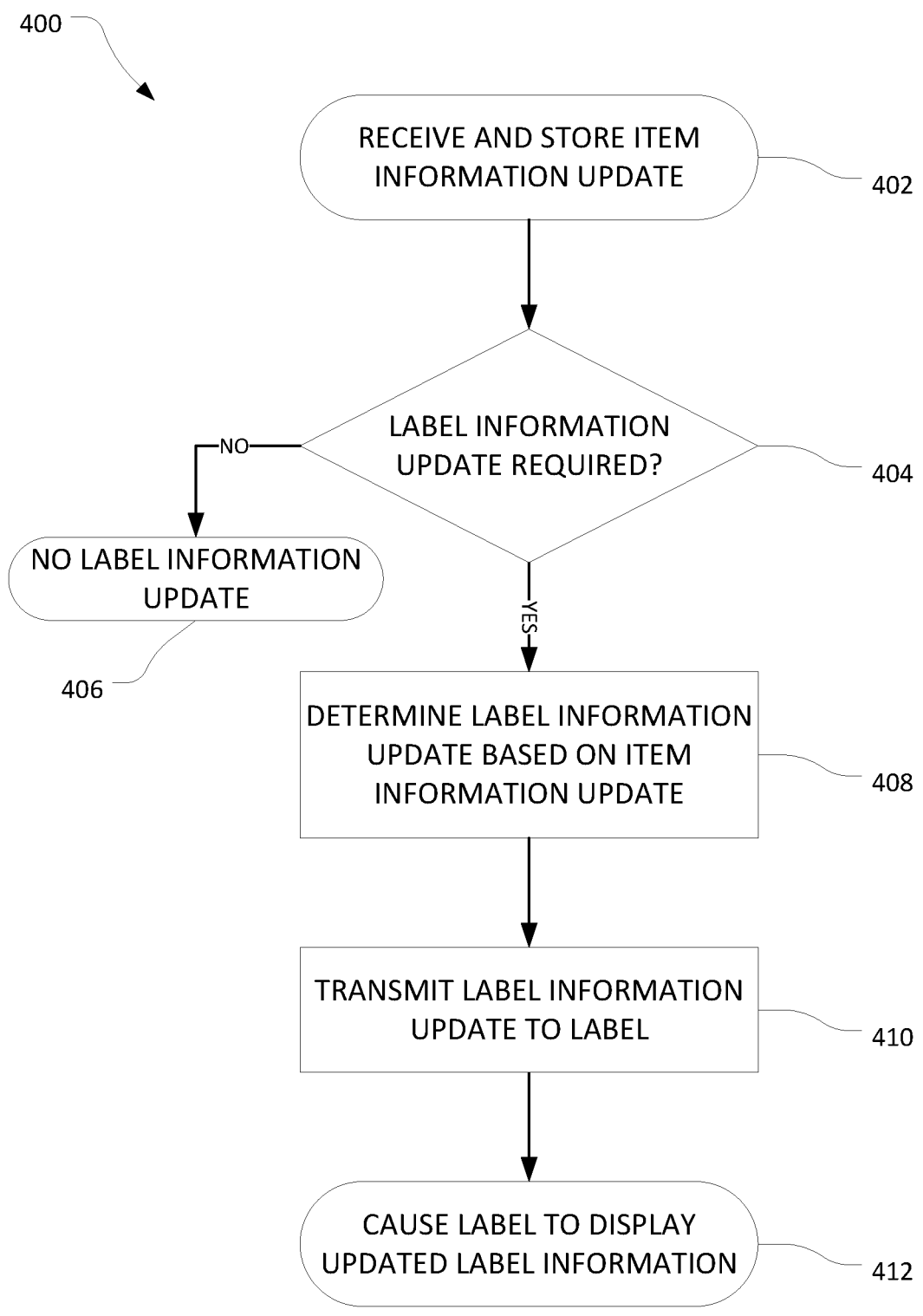
FIG. 4 is a flowchart illustrating an exemplary method of remotely updating a dynamically configurable label.

FIG. 4 is a flowchart illustrating an exemplary method 400 of remotely updating a dynamically configurable label 110. The method 400 may be performed, for example, as part or all of the sub-process 308 of FIG. 3. The method 400 can be performed by a computer system integrated within a system such as the distribution network 200 described herein. For example, the method 400 can be performed at least in part by components such as the dynamically configurable label 110, in conjunction with one or more external computer components such as a server 205 and/or a database 210 of the distribution network 200. It will be appreciated that some or all steps of the method 400 can be performed locally and/or remotely. For example, the method 400 can be performed by a combination of the dynamically configurable label 110 and the server 205 at least partly based on information and/or computer executable instructions stored within a remote memory such as the database 210.

The method 400 begins at block 402 when an item information update is received and stored. In the remote update method 400 of FIG. 4, the item information update may be received at the server 205 of the distribution network 200. The server 205 may cause the item information update to be stored in the database 210, for example, as one or more new entries in a relational database and/or as an update, edit, replacement, or other modification of one or more existing entries. In some embodiments, the item information update may include any one or more of the following: a request to route an item 100 to a different destination point 225 than originally planned, a request for delivery of the item 100 to the destination point 225 during a selected time window, a request to return the item 100 to the induction point, a request to change a service standard corresponding to the item (e.g., an upgrade to a faster/earlier delivery or a downgrade to a slower/later delivery), an indication of an event or condition at the destination point 225 or an intermediate point 220, an indication that the item has been incorrectly routed and needs to be rerouted, an indication of a payment failure, or other update to the item information stored in the database 210. In some embodiments, the update can include updating a vanity address to a street address understandable to the delivery resource. In some cases, the item information update may include a single update affecting multiple items 100. For example, an event or condition may be a weather event such as a tornado warning in the vicinity of a distribution network facility (which may be, for example, an intermediate point 220 and/or a destination point 225), which may cause an update to the item information of some or all items 100 scheduled for delivery to, or transit through, the affected unit delivery facility. When the item information update is received and stored, the method 400 continues to decision state 404.

At decision state 404, it is determined whether a label information update is required based on the item information update. The determination at decision state 404 may occur at the server 205 or another computing device of the distribution network 200. In some embodiments, certain updates to the item information of an item 100 may not merit a label information. For example, if a request to upgrade to a faster delivery time is received when the item 100 is already out for delivery the same day, the server 205 may determine that the upgrade is not possible or does not merit an update to the label information. If it is determined at decision state 404 that a label information update is not required, the method 400 terminates at block 406 and the label information is not updated.

Returning to decision state 404, the processor 205 may also determine that a label information update is required. For example, if the item information update includes any feasible modification to the place or time of delivery, or to the routing of the item 100 between the induction point 215 and the destination point 225 (e.g., routing through different intermediate points 220 than originally planned), revised label information may need to be displayed on the display 120 of the dynamically configurable label 110 in order to effect the requested update. If it is determined at decision state 404 that a label information update is required, the method 400 continues to block 408.

At block 408, the processor 205 determines an appropriate label information update based on the item information update. In some embodiments, the label update may be selected from one or more predetermined label updates stored in the database 210, or may be a custom label information update corresponding to a specific item information update. In one example, where the item information update includes a change in the destination point 225 or a return to the induction point 215, the corresponding label information update may include updating the displayed label information on the display 120 to replace the address of a previously planned destination point 225 with the address of the new destination point 225. In the case of a return to the induction point 215, or if the change in the destination point 225 requires a substantially different routing through one or more different intermediate points 220, the corresponding label information update may further include displaying an instruction regarding an alternative routing of the item (e.g., the updated address or induction point may be displayed in the routing information region 124, while the text "RETURN TO REGIONAL DISTRIBUTION FACILITY" or the like may be displayed in the notification region 122). In another example, where the item information update includes a requested time window for delivery to the destination point 225, the corresponding label information update may include augmenting the displayed label information on the display 120 to retain the destination point 225 address and add an indication of the time window (e.g., the address may continue to be displayed in the routing information region 124, while the text "DELIVER BETWEEN 1PM AND 4PM" is displayed in the notification region 122). In another example, where the item information update includes an upgrade in the service standard or an indication that the existing service standard may not be met due to delays, the corresponding label information update may include a notification (e.g., "SERVICE STANDARD IN JEOPARDY" or "NEW SERVICE STANDARD"), as well as new routing information (e.g., an intermediate point 220 such as a hub where the item 100 may be transferred to an airplane or more direct routing to expedite transit to the destination point 225).

In the example of a weather condition or other event, the corresponding label information update may leave the routing information on the display 120 unchanged, but may add a notification such as "TORNADO WARNING—DELIVER NEXT DAY." In another example, a label update may include a new barcode generated at the server 205 corresponding to an updated or changed record in the database 210. If the service class of the item is changed, a new barcode format may be required in some embodiments. If the delivery address is changed, an address encoded in the barcode (e.g., in a ZIP+4+2 format or the like) may need to be changed. A mailer identifier encoded in the barcode may also be changed by a label information update. It will be understood that the example label information updates provided above are merely examples, and that a variety of other label information updates may be provided and/or generated manually or automatically, corresponding to any particular item information update. In various embodiments, the updates to the label information determined at block 408 may further include a determination of an alert to be provided at the label in addition to displaying the updated label information (e.g., an audio or secondary visual indication). After the label information update has been determined, the method 400 continues to block 410.

At block 410, the label information update is transmitted to the dynamically configurable label 110. For example, the label information update can be sent from the server 205 to the network communication module 134 of the dynamically configurable label 110 via the network 135. In some embodiments, the label information update can include only the text to be displayed on the display 120 after the update, and this text may be displayed based on computer executable instructions stored in the memory 140 of the dynamically configurable label 110. In other embodiments, the label information can include the text to be displayed on the display 120 as well as computer executable instructions to be received and executed at the processor 132. In some embodiments, the computer executable instructions may include one or more instructions that cause the secondary visual indicator 126 or the audio indicator 130 to provide an alert when the updated text is displayed. In some embodiments, the label information update may be transmitted in an encoded, abbreviated, encrypted, or other format (e.g., for security and/or to reduce the amount of data to be transmitted and received via the network 135). When the label information update is transmitted to the label 410, the method 400 continues to block 412.

At block 412, the system causes the dynamically configurable label 110 to display updated label information based on the label information update. For example, the alphanumeric content displayed on the display 120 of the dynamically configurable display 110 may change based on the execution by the processor 132 of computer executable instructions stored in the memory 140 and/or sent from the server 205 with the label information update. Displaying the updated label information may include, for example, any of the modifications to the displayed label information described above with reference to block 408. Displaying the updated label information may further include providing a secondary visual alert at the secondary visual indicator 126 and/or providing an audio alert at the audio indicator 130, for example, either based on instructions received in the label information update or determined locally at the processor 132. When the updated label information has been displayed, the method 400 terminates and transportation of the item 100 continues in accordance with the updated label information.

Figure 5:
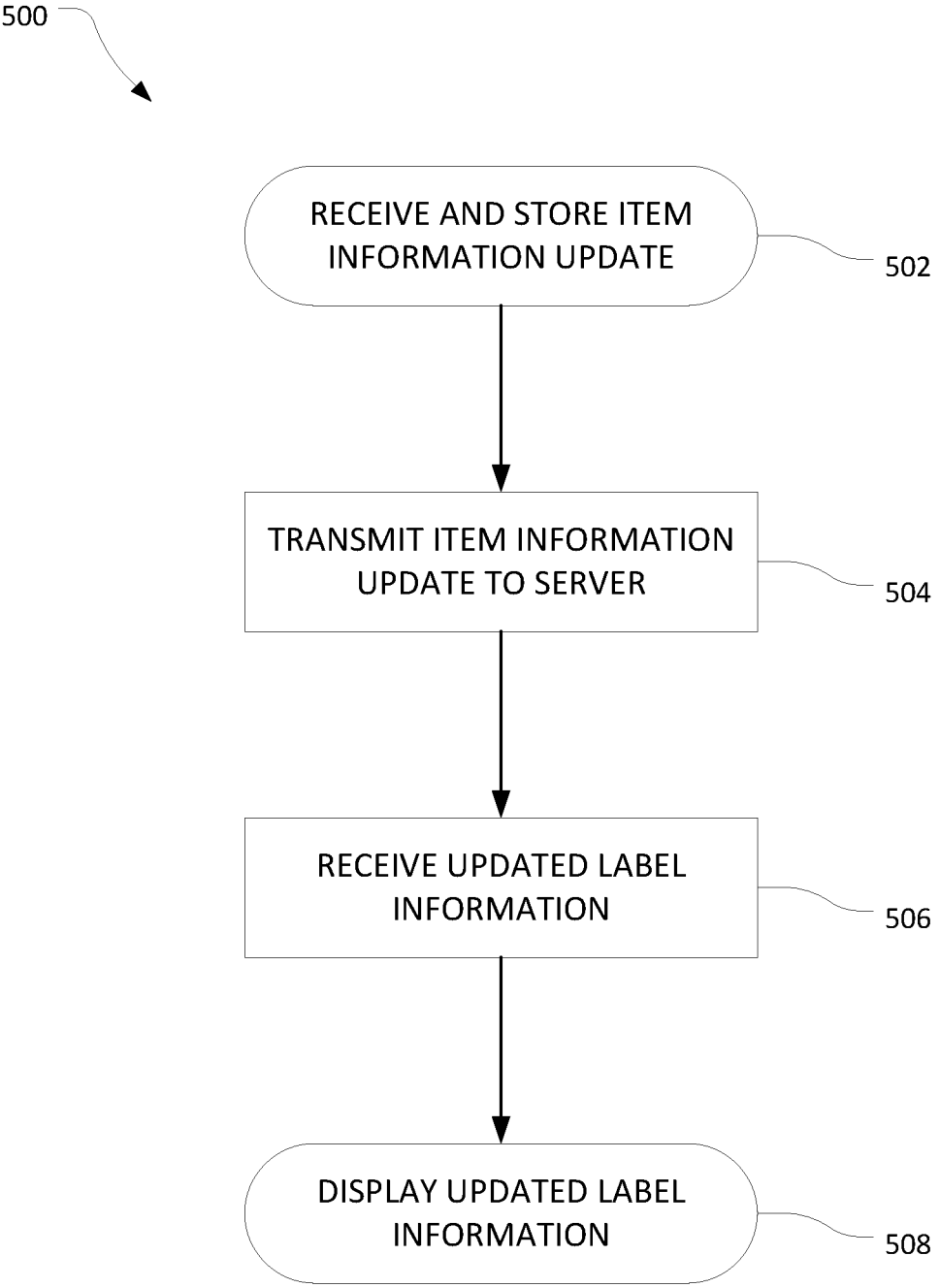
FIG. 5 is a flowchart illustrating an exemplary method of locally updating a dynamically configurable label.

FIG. 5 is a flowchart illustrating an exemplary method 500 of locally updating a dynamically configurable label 110. The method 500 may be performed, for example, as part or all of the sub-process 308 of FIG. 3. The method 500 can be performed by a computer system integrated within a system such as the distribution network 200 described herein. For example, the method 500 can be performed at least in part by components such as the dynamically configurable label 110, in conjunction with one or more external computer components such as a server 205 and/or a database 210 of the distribution network 200. It will be appreciated that some or all steps of the method 500 can be performed locally and/or remotely. For example, the method 500 can be performed by a combination of the dynamically configurable label 110 and the server 205 at least partly based on information and/or computer executable instructions stored within a local memory such as the memory 140 of the dynamically configurable label 110.

The method 500 begins at block 502 when an item information update is received and stored at the dynamically configurable label 110. In the local update method 500 of FIG. 5, the item information update may be received at the dynamically configurable label 110 rather than at the server 205 of the distribution network 200. For example, the item information update may be received from a handheld device controlled by an item carrier or supervisor, from a local communication device such as an RFID or NFC device located within a piece of mail processing equipment, may be auto-generated, etc. The processor 132 may cause the item information update to be stored in the memory 140. In some embodiments, the item information update may include any one or more of the following: an indication that the item 100 could not be delivered and/or a reason why the item 100 could not be delivered, an update to a real-time or near real-time location of the item 100, an indication that a temperature of a temperature-controlled item 100 will exceed a temperature limit, an indication that the item 100 has been delivered, an indication that the item 100 has been tampered with, or other update to the item information corresponding to the item 100. In some embodiments, if the item 100 is not delivered, the item information may automatically update the delivery address to, for example, a post office box or a parcel locker or other item receptacle at a unit delivery facility based on a customer preference. When the item information update is received and stored, the method 500 continues to block 504.

At block 504, the dynamically configurable label 110 transmits the item information update to the server 205. The item information update may be transmitted, for example, by the network communication module 134 under control of the processor 132, via the network 135 (e.g., via a cellular network, mobile internet, Wi-Fi, etc.). If the item 100 is in a location where the network is not accessible, the item information update may be retrieved from the memory 140 and sent to the server 205 at a later time when the network is accessible. In some embodiments, the dynamically configurable label 110 may be configured to locally determine at least some types of label information updates based on item information updates without involving the server 205, in which case the method 500 continues directly from block 502 to block 508. When the item information update has been sent to the server, the method 500 continues to block 506.

At block 506, the dynamically configurable label 110 receives updated label information from the server 205. The updated label information may similarly be received at the network communication module 134 via the network 135. In some embodiments, the updated label information can include only the text to be displayed on the display 120 after the update, and this text may be displayed based on computer executable instructions stored in the memory 140 of the dynamically configurable label 110. In other embodiments, the updated label information can include the text to be displayed on the display 120 as well as computer executable instructions to be received and executed at the processor 132. In some embodiments, the updated label information may be transmitted in an encoded, abbreviated, encrypted, or other format (e.g., for security and/or to reduce the amount of data to be transmitted and received via the network 135). The updated label information may be stored in the memory 140. In some embodiments, the updated label information may have been determined at the server 205 or other computing device of the distribution network 200, for example, as described above with reference to block 408 of FIG. 4. When the updated label information has been received, the method 500 continues to block 508.

At block 508, the dynamically configurable label 110 displays the updated label information at the display 120. For example, the alphanumeric content displayed on the display 120 may change based on the execution by the processor 132 of computer executable instructions stored in the memory 140 and/or sent from the server 205 with the updated label information. Displaying the updated label information may include, for example, any of the modifications to the displayed label information described above with reference to block 408 of FIG. 4. Displaying the updated label information may further include providing a secondary visual alert at the secondary visual indicator 126 and/or providing an audio alert at the audio indicator 130. When the updated label information has been displayed, the method 500 terminates and transportation of the item 100 continues in accordance with the updated label information.

Figure 6:
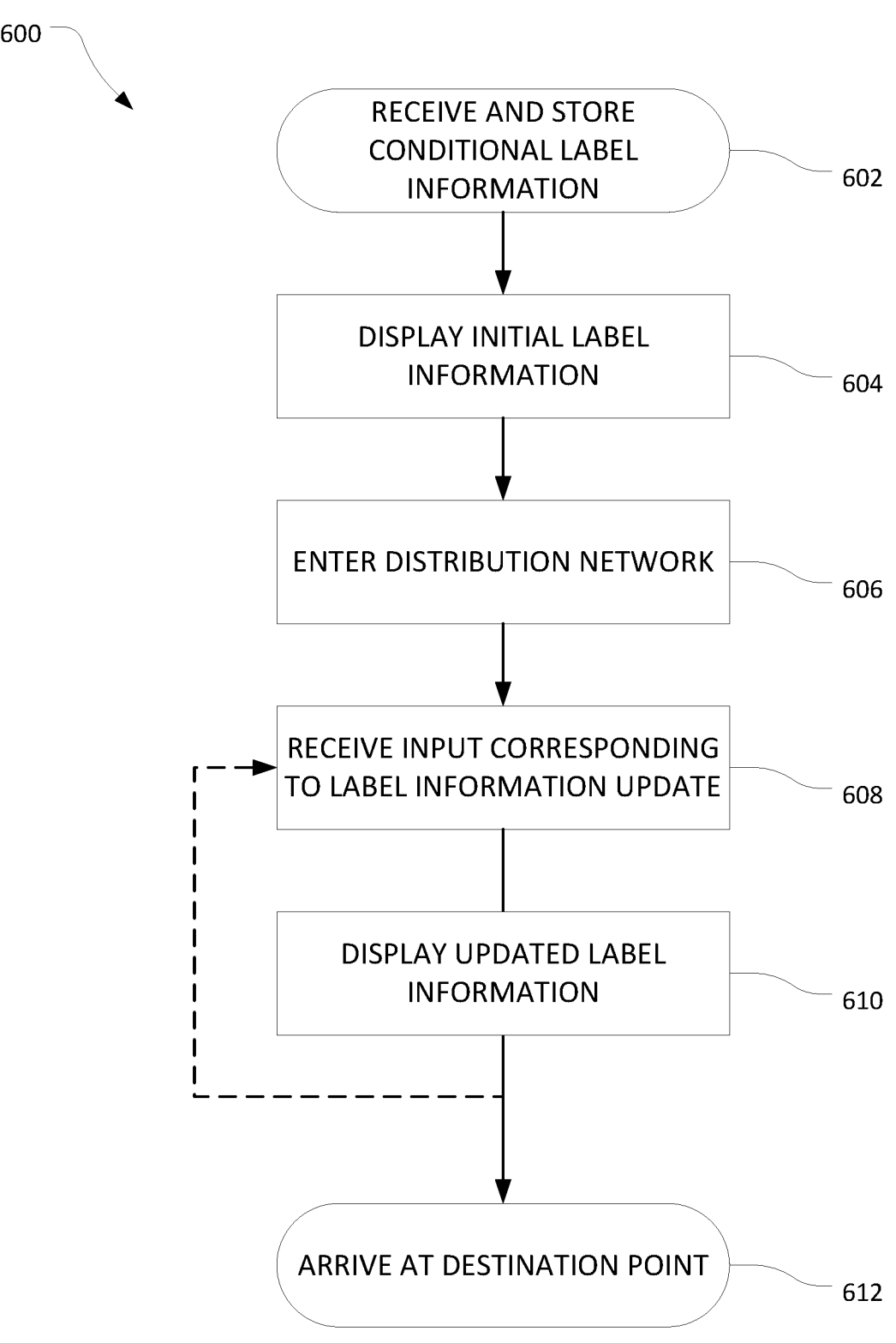
FIG. 6 is a flowchart illustrating an exemplary method of implementing a predetermined label configuration update.

FIG. 6 is a flowchart illustrating an exemplary method 600 of implementing a predetermined delivery label reconfiguration. The method 600 can be performed by a computer system integrated within a system such as the distribution network 200 described herein. For example, the method 600 can be performed at least in part by components such as the dynamically configurable label 110, alone or in conjunction with one or more external computer components such as a server 205 and/or a database 210 of the distribution network 200. It will be appreciated that some or all steps of the method 600 can be performed locally and/or remotely. For example, the method 600 can be performed by a combination of the dynamically configurable label 110 and the server 205 at least partly based on information and/or computer executable instructions stored within a local memory such as the memory 140 of the dynamically configurable label 110 and/or the database 210.

The method 600 begins at block 602, when conditional label information is received and stored at the dynamically configurable label 110. The conditional label information may be received from the interface 207 via the server 205 and/or locally via the local communication module 142. The conditional label information can include initial label information and one or more items of updated label information to be displayed when one or more label update conditions are met. For example, the initial label information may include routing information for display that corresponds to a hub, regional distribution facility, unit delivery facility, or other geographic region or intermediate point 220 corresponding to the destination point 225 for the item 100, while an item of updated label information may include a specific address or other information corresponding more specifically to the destination point 225. The initial label information may be displayed for a portion of the item's route from the induction point 215 to the destination point 225, and the updated label information may be displayed subsequently when the item 100 is closer to the destination point 225 so it may be delivered to the correct destination point 225. In some embodiments, the dynamically configurable label 110 may be used for pallets, carts, or other bulk item containers containing a plurality of items within and/or between facilities in the distribution network. For example, a container at a first regional distribution facility may hold items that all have individual determined routing plans requiring transfer to a second different regional distribution facility located across the country from the first regional distribution facility. In one example, the initial label information may include instructions to transfer the container of items to an intermediate hub located between the regional distribution facilities. Upon reaching the hub, the initial label information may be replaced by updated label information including instructions to transfer the container of items to the second regional distribution facility, or to a location within the hub facility, such as to a particular area, dock, or piece of processing equipment. The instructions in each label information may include a human-readable or machine readable identifier of the hub or regional distribution facility, and/or an identifier of an intra-facility location (e.g., a particular loading dock corresponding to a truck that will deliver the container to the next location). Upon reaching the second regional distribution facility, the items may be removed from the container and sent to unit delivery facilities corresponding to each item's determined routing plan.

In some embodiments, a portion of the conditional label information may be provided by a sender of the item 100 and another portion of the conditional label information may be provided by the distribution network 200. For example, in some cases conditional label information may be used when a recipient 230 (e.g., a celebrity, corporation, etc.) wishes to receive items through the distribution network 200 without publicly disclosing a home or business address of the recipient 230. In another example, a recipient expecting to receive a large volume of mail from many senders may utilize conditional label information to avoid the loss of items due to inaccurate addressing by some senders. In these examples, the recipient 230 may have a preexisting agreement with the distribution network 200 such that a sender may send an item 100 to the recipient 230 by providing only a predetermined initial label information phrase such as the name of the recipient 230 (e.g., "ONE DIRECTION," "X CORPORATION," etc.) or a predetermined phrase associated with the recipient 230 (e.g., "I LOVE THE NORTH MELBOURNE KANGAROOS," "PAUL MCCARTNEY FAN MAIL," etc.). Based on receiving the initial label information phrase from the recipient, the server 205 may retrieve one or more corresponding items of updated label information for subsequent display. The initial label information and updated label information may be transmitted to the dynamically configurable label 110. When the conditional label information has been received, the method 600 continues to block 604.

At block 604, the initial label information is displayed. The conditional label information, including the initial label information and updated label information, may be stored in the memory 140. To display the initial label information, the processor 132 may cause the initial label information to be retrieved from the memory 140 and displayed on the display 120. When the initial label information is displayed, the method 600 continues to block 606.

At block 606, the dynamically configurable label 110 enters the distribution network 200. For example, the dynamically configurable label 110 may enter the distribution network 200 affixed to an item 100 being deposited at an induction point 215 such as a unit delivery facility, drop box, residence, business, or the like. The item 100 and dynamically configurable label 110 may then be transported along a route to the destination point 225 corresponding to the recipient 230. Where a predetermined initial label information phrase has been established, processing and/or sorting equipment within the distribution network 200 may be configured to direct an item 100 to a preselected hub, regional distribution facility, unit delivery facility, etc., based on the predetermined initial label information phrase being displayed. When the dynamically configurable label 110 has entered the distribution network, the method 600 continues to block 608.

At block 608, the dynamically configurable label 110 receives an input corresponding to a label information update. The input may be an event corresponding to one or more predetermined conditions stored in the memory 140 of the dynamically configurable label 110. For example, in some embodiments the memory 140 stores each item of updated label information in a database entry associated with a predetermined input that will cause the existing label information to be replaced on the display 120 by the item of updated label information. The input may be received at one or more of the various components of the dynamically configurable label 110. In one example, the input can include a signal received at the local communication module 142. In this example, a piece of processing equipment at an intermediate point 220 or the induction point 215 may communicate with the dynamically configurable label 110 (e.g., using RFID, NFC, or the like) to initiate a label information update. In another example, the input can include the location of the dynamically configurable label 110, as detected by the GPS receiver 136. In one example, the label information update may be triggered when the dynamically configurable label 110 reaches a location within a predetermined radius (e.g., 10 miles, 5 miles, 1 mile, etc.) of the destination point 225 or another point along the item's route. In another example, the processor 132 can initiate a change in the display on the dynamically configurable label 110 when the item moves into a distribution network facility, when a vehicle transporting the item crosses a boundary, such as a state line, ZIP code boundary, etc.

Other examples of inputs that may cause the display 120 to advance to the next item of updated label information may include a signal received from a handheld device carried by an agent of the distribution network 200, a touch input received at the input 128 of the dynamically configurable label 110, a signal received from the server 205 at the network communication module 134, etc. In some embodiments, the input may include activation by NFC or other local communication signal within a mailbox, or a scan by a handheld device at the time of delivery. When the input has been received at the dynamically configurable label 110, the method 600 continues to block 610.

At block 610, the updated label information is displayed. In some embodiments, the processor 132 detects that the input has been received and, responsive to the input being received, causes the next item of updated label information to be retrieved from the memory 140 and displayed on the display 120. In other embodiments, the updated label information may be received from the server 205 and/or database 210 rather than from the memory 140. For example, the updated label information may be received with an input at the network communication module 134, or the processor 132 may request the updated label information from the server 205 in response to the input. The updated label information may include, for example, an identifier corresponding to a next intermediate point 220 to which the item 100 should be directed, an address or other identifier of the destination point 225, or any other sequential information facilitating transport of the item 100 to the recipient 230. When the updated label information is displayed, the method 600 can continue to block 612 or may return to block 608 if there are additional items of updated label information to be displayed. It will be understood that blocks 608 and 610 may be repeated as many times as desired or as necessary to sequentially implement all of the updated label information necessary for distribution of the item 100 from the induction point 215 to the destination point 225.

At block 612, the method 600 terminates as the dynamically configurable label 110 arrives at the destination point 225 based on the last item of updated label information. In some embodiments, the last item of updated label information to be displayed can be an address of a residence or business corresponding to the recipient 230, allowing an item carrier or other agent of the distribution network 200 to know where the item 100 is to be delivered and deliver the item 100 accordingly. In other cases, the last item of updated label information can be an identifier of a P.O. box, unit delivery facility, or other location where the recipient 230 can retrieve the item 100. Thus, the method 600 can use dynamically configurable labels 110 to enhance security and/or convenience by permitting senders to send items 100 to a desired recipient 230 without requiring the recipient 230 to provide a standard mailing address.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for delivery of items comprising:
a dynamically configurable label for delivery of an item, comprising an electronic display configured to display label information, and a network communication module configured for wireless communication;
a database storing a route for an item to destination point, the route comprising a sequence of planned intermediate points along the route to the destination point; and
a server in communication with the database and with the dynamically configurable label via the network communication module, wherein the server is configured to:
transmit, to the dynamically configurable label associated with the item, initial label information and a destination point identifier such that the initial label information, the sequence of planned intermediate points, and the destination point identifier are stored in a memory of the dynamically configurable label; and
receive an indication that the item has been received at a facility in a distribution network, the item having the dynamically configurable label affixed thereto, the electronic display displaying initial label information indicating a first intermediate point of the sequence of planned intermediate points;
wherein the dynamically configurable label comprises processing circuitry configured to:

detect that the item has been scanned by processing equipment at the first intermediate point of the sequence of planned intermediate points;
retrieve, from the memory of the dynamically configurable label, a next one of the sequence of planned intermediate points along the route in response to detecting that the item has been scanned;
cause the electronic display to display the next one of the sequence of planned intermediate points along the route;
cause delivery of the item to the next one of the sequence of intermediate points along the route via the distribution network;
detect that the item has been scanned at a final one of the sequence of planned intermediate points along the route; and
in response to detecting that the item has been scanned at the final one of the sequence of planned intermediate points, cause the electronic display to display the destination point, wherein the planned intermediate points are displayed in a machine-readable format and the destination point is displayed in a human-readable format.

2. The system of claim 1, wherein the electronic display comprises an electronic ink display.

3. The system of claim 1, the database storing item information associated with the item.

4. The system of claim 1, wherein the sensed characteristic comprises one or more of a temperature, revised delivery address, a request to return the item to a sender, a request to change a standard of service associated with the item, and a condition notification associated with the destination point.

5. The system of claim 1, wherein the dynamically configurable label comprises a GPS receiver.

6. The system of claim 5, wherein the GPS receiver is in communication with the network communication module, and wherein the network communication module is configured to send location information from the GPS receiver to the server.

7. The system of claim 5, wherein the GPS receiver is in communication with a processor within the dynamically configurable label, and wherein the processor is configured to cause the electronic display to display the next one of the sequence of planned intermediate points along the route based at least in part on location information received from the GPS receiver.

8. The system of claim 1, wherein the dynamically configurable label comprises a secondary indicator configured to produce at least one of light and sound, the secondary indicator configured to produce a visible or audible notification associated with display of the next one of the sequence of planned intermediate points.

9. A method for distributing items to recipients, the method comprising:
determining, for an item, a route for the item to a destination point, the route comprising a sequence of planned intermediate points along the route to the destination point;
transmitting, to a dynamically configurable label associated with the item, label information including a destination point identifier and the sequence of planned intermediate points;
storing, in a memory of the dynamically configurable label, the sequence of planned intermediate points, and the destination point identifier are stored;

receiving, at a facility in a distribution network, the item having the dynamically configurable label affixed thereto, the dynamically configurable label comprising an electronic display displaying first label information corresponding to the item, wherein the first label information comprises a first intermediate point of the sequence of planned intermediate points;

detecting, by the dynamically configurable label, that the item has been scanned by processing equipment at the facility;

in response to detecting that the item has been scanned, retrieving, from the memory of the dynamically configurable label, a next one of the sequence of planned intermediate points along the route;

causing the electronic display to display the next one of the sequence of planned intermediate points along the route;

causing the item to be delivered to the next one of the sequence of planned intermediate points along the route via the distribution network;

detecting that the item has been scanned at a final one of the sequence of planned intermediate points along the route; and in response to detecting that the item has been scanned at the final one of the sequence of planned intermediate points, causing the electronic display to display the destination point, wherein the planned intermediate points are displayed in a machine-readable format and the destination point is displayed in a human-readable format.

10. The method of claim 9, wherein the first label information comprises an identifier associated with a destination point corresponding to the item.

11. The method of claim 9, further comprising sensing, via a sensor, a characteristic of the item, wherein the characteristic comprises at least one of a revised delivery address, a request to return the item to a sender, a request to change a standard of service associated with the item, and a condition notification associated with the destination point.

12. The method of claim 9, wherein the next one of the sequence of planned intermediate points comprises an identifier associated with the next one of the sequence of planned intermediate points.

13. The method of claim 9, further comprising causing the electronic display to display a notification associated with the item, and wherein the electronic display of the dynamically configurable label continues displaying the first label information while the notification is displayed.

14. The method of claim 13, wherein notification comprises a textual message instructing a carrier of the distribution network to delay delivery of the item due to a weather condition at a destination point of the item.

15. The method of claim 9, further comprising, in response to causing the electronic display to display the next one of the sequence of planned intermediate points along the route, causing the dynamically configurable label to produce at least one of an audio notification and a secondary visual notification.

16. A method for distributing items to recipients, the method comprising:

determining, for an item, a route for the item to a destination point, the route comprising a sequence of planned intermediate points along the route to the destination point;

receiving, at a server of a distribution network, an initial label information for delivery of the item in the distribution network;

determining, based on the initial label information, a destination point identifier corresponding to the recipient associated with the item;

transmitting, to a dynamically configurable label associated with the item, the initial label information and the destination point identifier;

storing in a memory of the dynamically configurable label the initial label information, the sequence of planned intermediate points, and the destination point identifier;

causing an electronic display of the dynamically configurable label to display the initial label information;

receiving, at a first one of the sequence of planned intermediate points, the dynamically configurable label affixed to the item;

detecting, by the dynamically configurable label, that the item has been scanned by processing equipment at the first one of the sequence of planned intermediate points;

in response to detecting that the item has been scanned, retrieving, from the memory of the dynamically configurable label, a next one of the sequence of planned intermediate points along the route;

displaying, on the electronic display, the next one of the sequence of planned intermediate points along the route; and causing delivery of the item to the next one of the sequence of intermediate points along the route via the distribution network;

detecting that the item has been scanned at a final one of the sequence of planned intermediate points along the route; and in response to detecting that the item has been scanned at the final one of the sequence of planned intermediate points, causing the electronic display to display the destination point, wherein the planned intermediate points are displayed in a machine-readable format and the destination point is displayed in a human-readable format.

17. The method of claim 16, wherein the destination point identifier comprises a street address associated with the recipient.

18. The method of claim 16, further comprising preventing the electronic display of the dynamically configurable label from displaying the destination point identifier until a sender has deposited the item with the distribution network.

19. The method of claim 16, wherein causing the electronic display to display the destination point identifier occurs based on the dynamically configurable label reaching a location within a predetermined radius of a destination point identified by the destination point identifier.

20. The method of claim 19, wherein the dynamically configurable label is configured to detect the location of the dynamically configurable label based on a GPS receiver within the dynamically configurable label, and wherein causing the electronic display of the dynamically configurable label to display the destination point identifier occurs in response to the detected location of the dynamically configurable label.

* * * * *